Patented Apr. 7, 1953

2,634,266

UNITED STATES PATENT OFFICE 2,634,266

PENICILLIN SALT OF NICOTINOTHIO-DIETHYLAMIDE

Harley W. Rhodehamel, Jr., Indianapolis, Ind., assignor to Eli Lilly and Company, Indianapolis, Ind., a corporation of Indiana No Drawing. Application February 13, 1952, Serial No. 271,440

2 Claims. (Cl. 260—239.1)

This invention relates to a novel penicillin salt and the preparation thereof.

I have discovered that nicotinothiodiethylamide or its salts can be combined with penicillin or its salts by neutralization or metathetical reactions to form a sparingly soluble penicillin salt, thereby affording a means of precipitating penicillin from solution, and of purifying penicillin. Moreover, the novel penicillin salt can be utilized therapeutically. A prolonged penicillin blood level can be secured upon administering the salt parenterally by methods known to the medical art.

The following examples illustrate the preparation of the novel salt of this invention:

Example 1

To 2 g. of a solution of penicillin (e. g. a commercial mixture of the several penicillins) dissolved in 25 ml. of amyl acetate are added 2 g. of nicotinothiodiethylamide dissolved in 30 ml. of amyl acetate. The mixture is cooled and stirred occasionally whereupon the nicotinothiodiethylamide salt of penicillin precipitates. The salt is isolated as by decantation or filtration, and dried in vacuo.

The salt is represented by the following formula in which P represents penicillin:

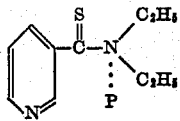

Example 2

To an aqueous solution of 0.3 g. of the potassium salt of penicillin G in 1.8 ml. of water is added a solution of 0.3 g. of nicotinothiodiethylamide hydrochloride in 10 ml. of water. The mixture is cooled and stirred occasionally whereupon the slightly soluble nicotinothiodiethylamide salt of penicillin G precipitates. The salt is separated, and dried in vacuo.

Nicotinothiodiethylamide can be prepared according to the method of Kornfeld, J. Organic Chem. 16, 131, (1951).

I claim:

1. The nicotinothiodiethylamide salt of penicillin represented by the following formula in which P represents penicillin:

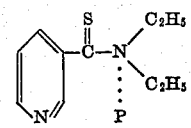

2. The nicotinothiodiethylamide salt of penicillin G.

HARLEY W. RHODEHAMEL, Jr.

No references cited.